(12) United States Patent
Lin

(10) Patent No.: US 11,345,629 B2
(45) Date of Patent: *May 31, 2022

(54) GLASS MATERIAL WITH LOW DIELECTRIC CONSTANT ATTRIBUTABLE TO HIGH WEIGHT PERCENTAGE OF BORON TRIOXIDE

(71) Applicant: TAIWAN GLASS INDUSTRY CORP., Taipei (TW)

(72) Inventor: Chia-Yu Lin, Taipei (TW)

(73) Assignee: TAIWAN GLASS INDUSTRY CORP., Taipei (TW)

( * ) Notice: Subject to any disclaimer, the term of this patent is extended or adjusted under 35 U.S.C. 154(b) by 78 days.

This patent is subject to a terminal disclaimer.

(21) Appl. No.: 16/572,734

(22) Filed: Sep. 17, 2019

(65) Prior Publication Data
US 2021/0002163 A1 Jan. 7, 2021

(30) Foreign Application Priority Data
Jul. 3, 2019 (TW) ................................ 108123406

(51) Int. Cl.
*C03C 3/091* (2006.01)
*C03C 13/00* (2006.01)
*C03C 3/087* (2006.01)

(52) U.S. Cl.
CPC .................................... *C03C 3/087* (2013.01)

(58) Field of Classification Search
CPC ......... C03C 3/046; C03C 3/087; C03C 3/091; C03C 13/046; C03C 13/00
See application file for complete search history.

(56) References Cited

U.S. PATENT DOCUMENTS

| | | | | |
|---|---|---|---|---|
| 4,824,806 A | * | 4/1989 | Yokoi | C03C 13/00 501/35 |
| 5,747,396 A | * | 5/1998 | Miyakoshi | C03C 3/091 501/32 |
| 5,958,808 A | * | 9/1999 | Mori | C03C 3/091 501/38 |
| 6,309,990 B2 | * | 10/2001 | Tamura | C03C 13/00 501/35 |
| 7,678,721 B2 | * | 3/2010 | Boessneck | D04H 1/4218 501/35 |
| 10,329,186 B2 | * | 6/2019 | DeLamielleure | C03C 3/093 |
| 2020/0087196 A1 | * | 3/2020 | Inaka | C03C 3/087 |

FOREIGN PATENT DOCUMENTS

| | | | | |
|---|---|---|---|---|
| CN | 101012105 A | * | 8/2007 | ............ C03C 3/093 |
| JP | S62-100454 A | | 5/1987 | |
| JP | S64-79085 A | | 3/1989 | |
| JP | 2002137938 A | * | 5/2002 | ............ C03C 13/00 |
| JP | 2005225908 A | * | 8/2005 | |
| JP | R2-2020093959 A | | 6/2020 | |
| TW | 201542490 A | | 11/2015 | |
| WO | WO-9816482 A1 | * | 4/1998 | ............ C03C 13/00 |

* cited by examiner

*Primary Examiner* — Karl E Group
(74) *Attorney, Agent, or Firm* — CIPO IP Group

(57) ABSTRACT

A glass material with a low dielectric constant attributable to a high weight percentage of boron trioxide includes at least one component for forming the main constructure of the glass material, a fluxing component, a reinforcing component, and a modifier; wherein the at least one component for forming the main constructure of the glass material includes silicon dioxide ($SiO_2$); the fluxing component includes boron trioxide ($B_2O_3$); the reinforcing component includes aluminum oxide ($Al_2O_3$); and the modifier includes calcium oxide (CaO). The glass material is characterized in that it has a boron trioxide ($B_2O_3$) content by weight of 30%-40%, which is higher than those in the prior art; a calcium oxide (CaO) content by weight of 1%-6%, which is lower than those in the prior art; and consequently a lower dielectric constant and a lower dissipation factor of the glass material than those in the prior art can be obtained.

10 Claims, No Drawings

GLASS MATERIAL WITH LOW DIELECTRIC CONSTANT ATTRIBUTABLE TO HIGH WEIGHT PERCENTAGE OF BORON TRIOXIDE

FIELD OF THE INVENTION

The present invention relates to a glass material and more particularly to a glass material whose boron trioxide ($B_2O_3$) content is higher than in the prior art and whose calcium oxide (CaO) content is lower than in the prior art such that the dielectric constant of the glass material is lower than in the prior art.

BACKGROUND OF THE INVENTION

Due to its outstanding physical properties, glass fiber has been an indispensable material in modern industries. "Glass fiber yarn", for example, which is made of electronic-grade glass fiber, is an essential substrate material of printed circuit boards. As an inorganic fiber, glass fiber has a circular cross section with a diameter ranging from several μm to 20 μm, and has a density ranging from 2.4 to 2.7 g/cm$^3$. Moreover, glass fiber can be categorized according to its composition and the percentages of its constituent materials. The aforesaid electronic-grade glass fiber, for instance, is nowadays typically made of "E-glass", whose major components are generally silicon dioxide ($SiO_2$, at 52%-62%), aluminum oxide ($Al_2O_3$, at 12%-16%), calcium oxide (CaO, at 16%-25%), magnesium oxide (MgO, at 0-5%), and boron trioxide ($B_2O_3$, at 0-10%), and whose dielectric constant (DK) and dissipation factor (DF) are about 6.8-7.1 and 0.006 respectively.

The dielectric constant of E-glass, however, leaves something to be desired as explained below. With the advancement of wired and wireless network technologies and the rising market demand for electronic devices (e.g., smartphones and tablet computers), electronic devices with different functions have been developed, and to increase the operating speed and frequency of an electronic device, the circuit board used therein must almost always be made of low-dielectric-constant and low-dissipation-factor materials to meet the electrical specifications. Obviously, E-glass does not comply with the requirement in terms of its dielectric constant. Many glass manufacturers, therefore, have begun improving the components or composition of glass, with a view to developing glass materials that are more suitable for use in circuit boards. While some of the improved glass materials do have lower dielectric constants than the conventional ones, a test performed by the applicant on those materials shows room for further improvement. According to the test results presented in Table 1 below, the dielectric constants of all the glass samples A1 to A8 are still not lower than 4.7, and some are even higher than 5. These dielectric constants remain unsatisfactory for circuit boards with special requirements in electrical property.

TABLE 1

| Composition (wt %) | A1 | A2 | A3 | A4 | A5 | A6 | A7 | A8 |
|---|---|---|---|---|---|---|---|---|
| $SiO_2$ | 51.5 | 51.3 | 49.3 | 48.4 | 48.3 | 49.2 | 49.6 | 48.9 |
| $B_2O_3$ | 22.99 | 24.57 | 25.89 | 27.37 | 27.24 | 25.60 | 26.89 | 29.17 |
| CaO | 9.4 | 8.42 | 9.78 | 9.48 | 9.39 | 9.87 | 8.55 | 7.48 |
| $Al_2O_3$ | 12.4 | 12.4 | 13.3 | 12.9 | 12.7 | 13.1 | 11.0 | 11.8 |
| $K_2O$ | 0.32 | 0.083 | 0.088 | 0.094 | 0.072 | 0.081 | 0.138 | 0.237 |
| $Na_2O$ | 0.587 | 0.792 | — | 0.385 | 0.289 | 0.303 | 0.371 | 0.441 |
| MgO | 0.580 | 0.505 | 0.132 | 0.160 | 0.195 | 0.155 | 0.160 | 0.125 |
| T3(° C.) | 1252.75 | 1272.18 | 1233.62 | 1230.39 | 1230.28 | 1233.98 | 1260.59 | 1246.02 |
| Dielectric constant (at 1G Hz) | 5.1 | 4.9 | 5.0 | 4.9 | 5.1 | 5.0 | 4.8 | 4.7 |
| Dissipation factor (at 1G Hz) | 0.006 | <0.001 | <0.001 | <0.001 | 0.001 | 0.001 | 0.001 | 0.001 |

Given that glass is made from a combination of components, each of which may have certain effect on the properties of the resulting glass products, the issue to be addressed by the present invention is to develop a glass material whose composition produces a lower dielectric constant than those of the prior art.

BRIEF SUMMARY OF THE INVENTION

In view of the unsatisfactory dielectric constants of the prior glass materials used to make circuit boards, and in order to provide an effective solution to the problem stated above, the inventor of the present invention incorporated years of practical experience into an extensive research and repeated trials and finally succeeded in developing a glass material whose high weight percentage of boron trioxide leads to a low dielectric constant of the material.

One objective of the present invention is to provide a glass material having a low dielectric constant attributable to a high weight percentage of boron trioxide. The glass material includes at least one component for forming the main constructure of the glass material, a fluxing component, a reinforcing component, and a modifier. The at least one component for forming the main constructure of the glass material includes silicon dioxide ($SiO_2$), which makes up 45%-55% by weight of the glass material. The fluxing component is used to lower the viscosity of the glass material while the glass material is in the molten state, and includes boron trioxide ($B_2O_3$), which makes up 30%-40% by weight of the glass material. The reinforcing component serves to increase the structural strength of the glass material and includes aluminum oxide ($Al_2O_3$), which makes up 10%14% by weight of the glass material. The modifier is used to increase the water resistance of the glass material and includes calcium oxide (CaO), which makes up 1%-6% by weight of the glass material. Thus, by increasing the boron trioxide ($B_2O_3$) content and reducing the calcium oxide (CaO) content as compared with those in the prior art, the glass material of the present invention is provided with a low dielectric constant and low dissipation factor that allow circuit boards or other products made of the glass material to have the required electrical properties.

DETAILED DESCRIPTION OF THE INVENTION

The present invention provides a glass material whose high weight percentage of boron trioxide imparts a low dielectric constant to the glass material, and which can be used to make glass fiber or other glass products. According to one embodiment of the invention, the glass material includes at least one component for forming the main constructure of the glass material, a reinforcing component, a fluxing component, and a modifier. The at least one component for forming the main constructure of the glass material includes silicon dioxide ($SiO_2$), which is one of the skeletal oxides generally used to form glass and constitutes 45%-55% by weight of the glass material. The reinforcing component is intended to increase the structural strength of the glass material and at least includes aluminum oxide ($Al_2O_3$), which is another skeletal oxide generally used to form glass. When there is insufficient aluminum oxide ($Al_2O_3$), the glass material will have low water resistance and a high dielectric constant, but when the weight percentage of aluminum oxide ($Al_2O_3$) exceeds 18%, the filament drawing process used to turn the glass material into glass fiber will require a high temperature. In this embodiment, therefore, aluminum oxide ($Al_2O_3$) constitutes 10%-14%, preferably 11%-43%, by weight of the glass material.

The fluxing component in this embodiment serves to reduce the viscosity of the glass material when the glass material is melted, and at least includes boron trioxide ($B_2O_3$), which constitutes 30%-40% by weight of the glass material. The modifier is used to increase the water resistance of the glass material and at least includes calcium oxide (CaO), which constitutes 1%-6% by weight of the glass material. It should be pointed out that in solid-state silicate- and borate-based glass, alkali metal ions and alkaline earth metal ions have a substantial effect on the dielectric constant of the glass; more specifically, the higher the contents of those ions, the higher the dielectric constant of the glass. Hence, while calcium oxide (CaO) is a glass network modifier capable of lowering the melting temperature of the glass material during a subsequent glass fiber forming process, increasing the calcium oxide (CaO) content will raise the dielectric constant of the glass material. In view of this, and to take advantage of the ability of boron trioxide ($B_2O_3$) to reduce the dielectric constant, dissipation factor, and melting temperature of glass, the present invention increases the boron trioxide ($B_2O_3$) content to 30%-40% by weight of the glass material and reduces the calcium oxide (CaO) content to 1%-6%, preferably 3.5%-6%, by weight of the glass material, as compared with those of the prior art. Therefore, the calcium oxide (CaO) content of the present invention is substantially lower than that (about 7%-10%) of the prior glass, and this allows the glass material of the invention to have a lower dielectric constant than its prior art counterparts (lower than about 4.5) and consequently the desired electrical properties.

The glass material may also include magnesium oxide (MgO), which serves mainly to lower the melting temperature of the glass material and thereby facilitate the melting of the glass material and the formation of glass fiber. However, as the magnesium in magnesium oxide (MgO) is an alkaline earth metal, an exceedingly high magnesium oxide (MgO) content works against the reduction of the dielectric constant and dissipation factor of the glass material and may also lead to phase separation of the glass material. In this embodiment, therefore, the total magnesium oxide (MgO) and calcium oxide (CaO) content is set at 1%-8% by weight of the glass material. The glass material may also be added with at least one alkali metal oxide for use as a fluxing component, wherein the at least one alkali metal oxide may include sodium oxide ($Na_2O$), potassium oxide ($K_2O$), and/or lithium oxide ($Li_2O$), and wherein the total content of the at least one alkali metal oxide is 0.01%-1% by weight of the glass material. As an excessively high alkali metal oxide content will increase the dielectric loss tangent, and impair the water resistance, of the glass material, the total content of the alkali metal oxide(s) is ideally 0.1%-0.5% by weight of the glass material.

The glass material disclosed herein can be formed into glass fiber by heating the glass components and then subjecting the resulting molten glass to a filament drawing process. As the high boron trioxide ($B_2O_3$) content and low calcium oxide (CaO) content provide the glass material with a low dielectric constant and low dissipation factor, products (e.g., circuit boards) made of the glass material will have a lower dielectric loss during high-frequency transmission, which is a required electrical property of certain circuit boards. To demonstrate the technical superiority of the present invention to the prior art, the applicant conducted the following tests and obtained the test results shown below in Table 2. The log 3 fiber-forming temperature ("log 3 FT" or "T3") is the temperature at which a melted glass composition has a viscosity of 1,000 poise. Three batches of materials B1 to B3 were prepared, each weighing 150 g and having a different composition from another batch. Each batch was poured into a 200 ml ceramic crucible and then heated at 1450° C. for about 6 hours, or until completely melted. The melt was allowed to cool down to room temperature gradually such that a glass block was formed. The glass block was cut with a diamond-tipped cutter into glass plate samples each having a length and width of 20 mm and a thickness of 2-3 mm. The dielectric constant and dissipation factor of each glass plate sample were then measured with a radio frequency (RF) impedance analyzer. According to the test results in Table 2, the glass material of the present invention has a dielectric constant equal to or lower than 4.5 and hence better electrical properties than the prior glass products.

TABLE 2

| Composition (wt %) | B1 | B2 | B3 |
|---|---|---|---|
| $SiO_2$ | 49.1 | 49.9 | 47.6 |
| $B_2O_3$ | 31.33 | 31.62 | 34.23 |
| CaO | 5.79 | 4.18 | 4.07 |
| $Al_2O_3$ | 11.6 | 11.6 | 11.4 |
| $K_2O$ | 0.129 | 0.215 | 0.174 |
| $Na_2O$ | 0.353 | 0.349 | 0.418 |
| MgO | 0.136 | 0.121 | — |
| T3(° C.) | 1302.36 | 1294.10 | 1284.65 |
| Dielectric constant (at 1 G Hz) | 4.5 | 4.4 | 4.3 |
| Dissipation factor (at 1 G Hz) | <0.001 | 0.001 | <0.001 |

It is worth mentioning that, although the compositions of B1 to B3 in Table 2 do not include lithium oxide ($Li_2O$), the same test results can be obtained with the addition of lithium oxide ($Li_2O$), provided that the total alkali metal oxide content of each batch remains unchanged.

While the invention herein disclosed has been described by means of specific embodiments, numerous modifications and variations could be made thereto by those skilled in the art without departing from the scope of the invention set forth in the claims.

What is claimed is:

1. A glass material with a low dielectric constant attributable to a high weight percentage of boron trioxide, comprising:
   at least one component for forming a main constructure of the glass material, wherein the at least one component for forming the main constructure of the glass material comprises silicon dioxide ($SiO_2$), and the silicon dioxide ($SiO_2$) makes up more than or equal to 45% and less than 50.4% by weight of the glass material;
   a fluxing component comprising boron trioxide ($B_2O_3$), wherein the boron trioxide ($B_2O_3$) makes up more than 35% and less than or equal to 40% by weight of the glass material and is used to reduce viscosity of the glass material when the glass material is melted;
   a reinforcing component comprising aluminum oxide ($Al_2O_3$), wherein the aluminum oxide ($Al_2O_3$) makes up 10%44% by weight of the glass material and is used to increase structural strength of the glass material; and
   a modifier comprising calcium oxide (CaO), wherein the calcium oxide (CaO) makes up 1%-6% by weight of the glass material and is used to increase water resistance of the glass material.

2. The glass material of claim 1, further comprising magnesium oxide (MgO), wherein the magnesium oxide (MgO) is used to lower a melting temperature of the glass material, and the magnesium oxide (MgO) and the calcium oxide (CaO) jointly make up 1%-8% by weight of the glass material.

3. The glass material of claim 1, further comprising at least one alkali metal oxide selected from the group consisting of sodium oxide ($Na_2O$), potassium oxide ($K_2O$), and lithium oxide ($Li_2O$), wherein the at least one alkali metal oxide makes up 0.01%-1% by weight of the glass material.

4. The glass material of claim 2, further comprising at least one alkali metal oxide selected from the group consisting of sodium oxide ($Na_2O$), potassium oxide ($K_2O$), and lithium oxide ($Li_2O$), wherein the at least one alkali metal oxide makes up 0.01%-1% by weight of the glass material.

5. The glass material of claim 3, wherein the aluminum oxide ($Al_2O_3$) makes up 11%-13% by weight of the glass material.

6. The glass material of claim 4, wherein the aluminum oxide ($Al_2O_3$) makes up 11%-13% by weight of the glass material.

7. The glass material of claim 5, wherein the calcium oxide (CaO) makes up 3.5%-6% by weight of the glass material.

8. The glass material of claim 6, wherein the calcium oxide (CaO) makes up 3.5%-6% by weight of the glass material.

9. The glass material of claim 7, wherein the at least one alkali metal oxide makes up 0.1%-0.5% by weight of the glass material.

10. The glass material of claim 8, wherein the at least one alkali metal oxide makes up 0.1%-0.5% by weight of the glass material.

* * * * *

UNITED STATES PATENT AND TRADEMARK OFFICE
CERTIFICATE OF CORRECTION

PATENT NO. : 11,345,629 B2
APPLICATION NO. : 16/572734
DATED : May 31, 2022
INVENTOR(S) : Chia-Yu Lin It is certified that error appears in the above-identified patent and that said Letters Patent is hereby corrected as shown below:

In the Specification

Column 3, Line 33: replace "10%14%" with --10%-14%--

Column 4, Line 2: replace "11%-43%" with --11%-13%--

In the Claims

Column 6, Line 10, i.e., Claim 1, Line 17: replace "10%44%" with --10%-14%--

Signed and Sealed this
Twenty-seventh Day of September, 2022

Katherine Kelly Vidal
*Director of the United States Patent and Trademark Office*